United States Patent [19]

Mineta et al.

[11] Patent Number: 5,047,677
[45] Date of Patent: Sep. 10, 1991

[54] ALUMINUM DISK MOTOR HAVING THERMAL COMPENSATION AND MAGNETIC SEALING

[75] Inventors: Sadayoshi Mineta; Koichi Katakura, both of Komagane, Japan

[73] Assignee: Sankyo Seiki Mfg. Co., Ltd., Nagano, Japan

[21] Appl. No.: 447,224

[22] Filed: Dec. 7, 1989

[30] Foreign Application Priority Data

Dec. 9, 1988 [JP] Japan .................. 63-160091

[51] Int. Cl.⁵ .................. H02K 5/02; G11B 33/14
[52] U.S. Cl. .................. 310/67 R; 310/90; 360/99.08; 384/478
[58] Field of Search .............. 277/80; 310/67 R, 90; 360/99.08, 98.07; 384/133, 478

[56] References Cited

U.S. PATENT DOCUMENTS

| | | | |
|---|---|---|---|
| 4,531,846 | 7/1985 | Raj | 277/80 |
| 4,772,032 | 9/1988 | Raj et al. | 277/80 |
| 4,797,762 | 1/1989 | Levy et al. | 360/99.06 |
| 4,814,652 | 3/1989 | Wright | 310/67 R |
| 4,818,907 | 4/1989 | Shirotori | 310/67 R |
| 4,882,643 | 11/1989 | Shirotori | 360/99.08 |
| 4,905,110 | 2/1990 | Krum et al. | 360/99.08 |

Primary Examiner—Peter S. Wong
Assistant Examiner—D. L. Rebsch
Attorney, Agent, or Firm—McAulay Fisher Nissen & Goldberg

[57] ABSTRACT

A motor for driving a magnetic disk in which the rotational center of the magnetic disk is a fixed shaft. The motor has a frame, a shaft formed integral with the frame, an armature, a bearing provided on the shaft, a hub to which a magnetic disk is securable, a magnetic sealing material arranged in the vicinity of the bearing and a magnetic material opposed to the sealing material. A magnetic seal is arranged between the magnetic sealing mateial and the magnetic material. The frame, the shaft, the hub and the magnetic disk are formed of aluminum, so that changes in temperature will not adversely affect motor performance due to the differences in thermal expansion of these motor parts. The magnetic material is in the form of a sleeve which enables the motor to be magnetically sealed and prevents foreign matter in the motor from reaching the magnetic disk.

3 Claims, 1 Drawing Sheet

ALUMINUM DISK MOTOR HAVING THERMAL COMPENSATION AND MAGNETIC SEALING

BACKGROUND OF THE PRESENT INVENTION (a) Field of the Present Invention

The present invention relates to a motor for rotating and driving a magnetic disk.

(b) Background of the Prior Art

A motor for rotating and driving a magnetic disk such as a hard disk made of aluminum includes two types, i.e., a shaft rotating type and a shaft fixed type.

In the shaft rotating type, the shaft is made to be rotatable with respect to a chassis, and the shaft cannot be locked. Therefore, the shaft tends to be inclined due to a change in temperature, which provides an unstable rotating element.

On the other hand, in the shaft fixed type, since both ends of the shaft can be locked to the chassis, the shaft will not be inclined with respect to the chassis even if a change in temperature occurs, and the magnetic disk is stably supported. Therefore, the shaft fixed type is an excellent choice for the magnetic disk driving motor.

With recent enhancement of recording density of a magnetic disk device, it has been required to prevent vibration of the shaft in order to stably rotate the magnetic disk. Therefore, performance requirements for the aforementioned shaft fixed type motor have increased. Moreover, it has been required that deformation of a hub, a shaft and a magnetic disk itself due to thermal expansion be prevented and that foreign matter such as oil be prevented from escaping from a shaft portion of a motor which would otherwise adhere to a surface of a magnetic disk.

A motor of this shaft fixed type is known, such as the motor disclosed in U.S. Pat. No. 4,760,298; this motor can obtain a relatively stable rotation. However, in the motor disclosed in this U.S. patent, no consideration has been given to scattering of foreign matter such as oil from the shaft portion of the motor.

In addition, with respect to the problem of distortion of a magnetic disk, a shaft, a hub or the like due to thermal expansion, recent magnetic disks are made of aluminum whereas hub 39, shaft 31 and a frame 1a are made of iron which has a different coefficient of thermal expansion from aluminum. Therefore, sufficient consideration has not been given to distortion resulting from such thermal expansion.

SUMMARY OF THE PRESENT INVENTION

It is an object of the present invention to prevent, in a magnetic disk driving motor of the fixed shaft type, distortion of a magnetic disk or of a motor due to thermal expansion and adhesion of foreign matter to the surface of the magnetic disk.

In accordance with the invention, in a motor for driving an aluminum magnetic disk in which a rotational center of the magnetic disk is a fixed shaft wherein the motor has a frame, a shaft formed integral with the frame, an armature mounted on the shaft, a bearing provided on the opposite end of the shaft with respect to the frame, a hub to which can be secured an aluminum magnetic disk to be mounted around the shaft, a magnetic sealing material arranged in the vicinity of the bearing on the end opposite to that of the frame with respect to the bearing, a magnetic material, provided opposed to said magnetic sealing material, in a radial direction of the hub, and a magnetic fluid arranged between the magnetic sealing material and the magnetic material, the improvement comprises that the frame, the shaft and the hub are formed of aluminum so that changes in temperature will not adversely affect motor performance due to the differences in thermal expansion of these motor parts.

In a particular embodiment of the present invention, the magnetic material referred to above is in the form of a ferromagnetic sleeve which enables the motor to be magnetically sealed and prevents foreign matter from the motor from reaching the magnetic disk.

For a better understanding of the present invention, reference is made to the following description and accompanying drawings, while the scope of the invention is pointed out by the appended claims.

DESCRIPTION OF THE PREFERRED EMBODIMENTS

Figure 1:
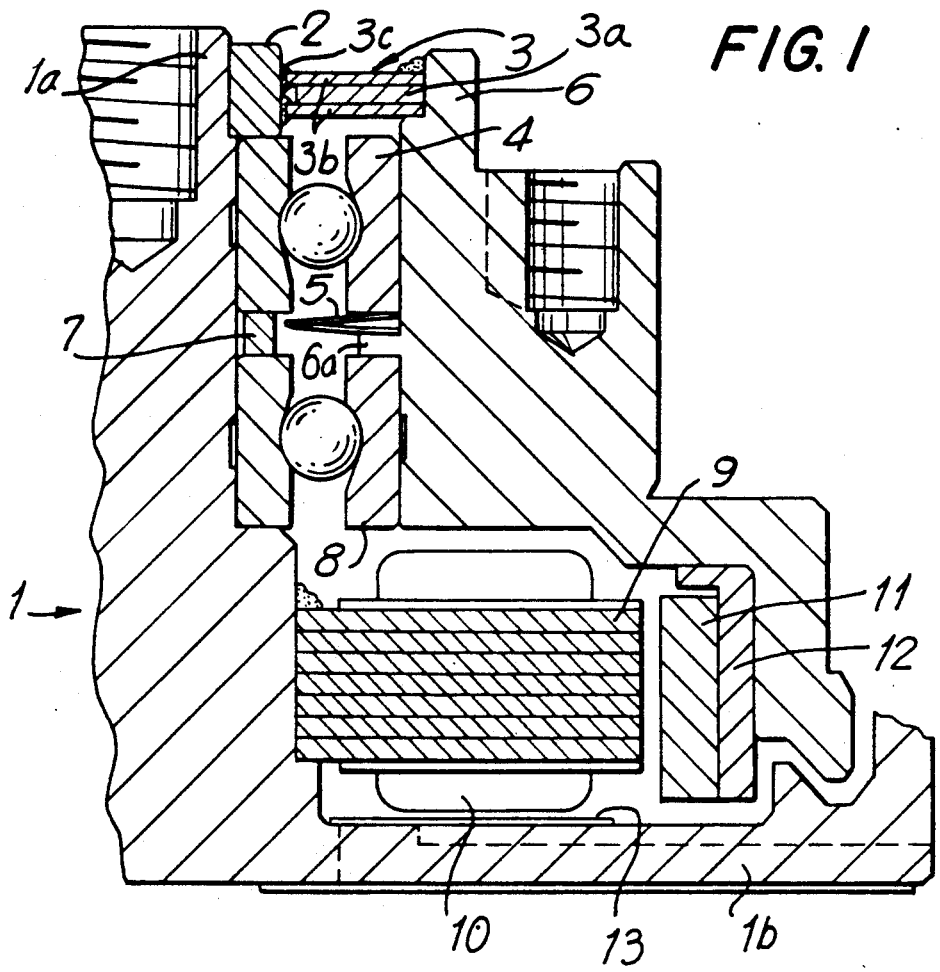
FIG. 1 represents an exploded partial side section of a motor in accordance with the invention.
Figure 2:
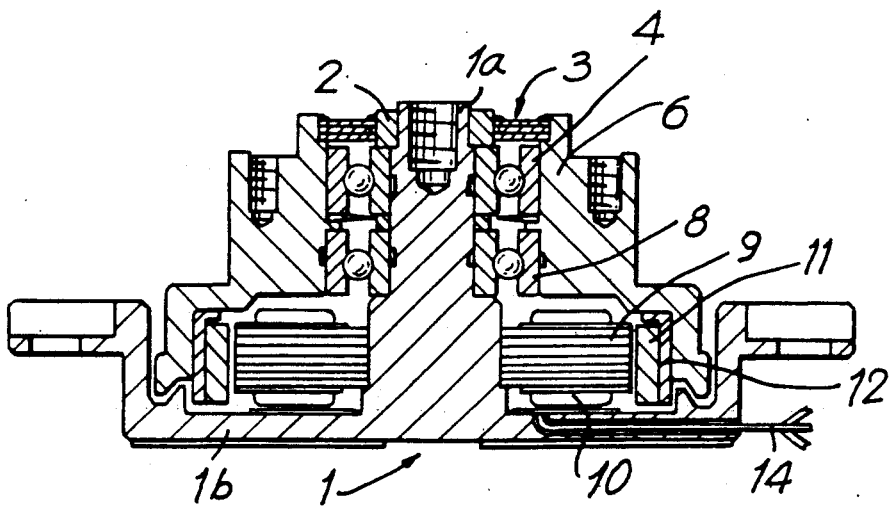
FIG. 2 represents a side cross section of the entire motor of FIG. 1.

In FIGS. 1 and 2, a yoke 12 is shrunk in a lower peripheral surface of a collar-like cylindrical aluminum hub 6 with a shoulder, and after cooling, a cylindrical driving magnet 11 magnetized to a suitable number of magnetic poles is adhered to the inner peripheral surface of the yoke 12. An outer race of a lower ball bearing 8, of two sets of ball bearings 4 and 8, is pressed and adhered to the upper inner peripheral surface of the hub 6. This completes the hub assembly.

Next, a plurality of cores are superposed in the form of a plate to form a core 9. A winding 10 is applied to the core 9, and one end of a lead wire 14 is soldered to the end of the winding 10. Portions of the core 9 and the winding 10 are subjected to varnishing, thus completing the core assembly of the motor.

Reference 1 designates a frame integral with a shaft made of aluminum. The frame integral with the shaft 1 comprises a portion of a center shaft 1a and a portion of a frame 1b formed integral with th center shaft 1a. An insulating sheet 13 is placed on the upper surface of the portion of the frame 1b, the lead wire 14 is inserted into a predetermined lead wire inserting groove of the portion of the frame 1b and drawn out predetermined drawing outlet, and the core assembly is inserted into and adhered to the lower portion of the portion of the center shaft 1a of the frame integral with the shaft 1.

The hub assembly is pressed into the upper portion of the portion of the center shaft 1a. At that time, the inner race of the ball bearing 8 is pressed into the outer peripheral portion of the center axis 1a. The portion of the center axis 1a and the inner race of the ball bearing 8 are adhered to each other after pressing. The upper end of the outer race of the ball bearing 8 is defined in position by a collar 6a formed in the inner peripheral portion of the hub 6. A pre-loaded spring 5 (such as one of the belleville type) is inserted on the collar 6a, and a spacer 7 for maintaining a spacing between two ball bearings 8 and 4 is inserted on the inner race of the ball bearing 8. Next, the inner race of the upper ball bearing 4 is pressed in and adhered to a portion of the center axis 1a, and the outer race of the ball bearing 4 is fitted in the upper end in the inner periphery of the hub 6. The outer race of the bearing is free with respect to the hub 6. Then, the sleeve 2 is pressed into the upper end of the center shaft 1a, and the magnetic sealing material 3 is inserted into and adhered to the upper end in the inner periphery of the hub 6, thus completing the assembly.

The magnetic sealing material 3 is in the shape of a ring in which both sides of a permanent magnet 3a are held by a ferromagnetic material 3b, for example, stainless steel or the like, and a magnetic fluid 3c is made to flow between the extreme end of the magnetic material 3b and the sleeve 2 made of a magnetic material opposed thereto to thereby provide a seal between the bearing 4 side and the outer side of the motor. By the term "magnetic" in the context of this application is generally meant magnetized or capable of being magnetized. The principle of the magnetic seal is that a magnetic fluid is sealed between a magnetic seal and a magnetic material opposed thereto to provide a seal. Typically, the magnetic fluid is a colloid such as one composed of the particulates of $Fe_3O_4$ or an Fe-Co alloy (approximately 100 Å in diameter) which is dispersed in water or other solvent. This cannot be done, however, in the motor of the present invention, since the hub 6 or the center shaft 1a of the motor is formed of aluminum, which is a non-magnetic material. Therefore, for the keeping of the ball bearing 4 and for the structure of a magnetic path of a magnetic seal, the sleeve 2 is made of a magnetic material, which also serves as a keep member for the ball bearing 4. Accordingly, even if the hub 6 and the center shaft 1a of the motor are formed of aluminum which is a non-magnetic material, it is possible to provide a magnetic seal construction. It should be understood that reference to aluminum in the context of the present invention includes alloys of aluminum.

The above described two ball bearings 4 and 8 have the same dimension, which may be normally used. With the assembly as described above, the hub 6 is rotatably supported by two ball bearings 4 and 8 aligned in the inner peripheral surface on the counter frame side in an axial direction of the hub 6.

The outer race of one ball bearing 4 is made free with respect to the hub 6 because a pre-load is applied to the ball bearing 4 by the belleville spring 5.

A suitable number of hard magnetic disks are mounted in a spaced relation in the outer peripheral portion of the hub 6 by known means.

According to the present invention, since the hub 6, the center shaft 1a portion and the frame 1b portion are formed of aluminum, they are the same in material as the hard magnetic aluminum disk, and the coefficient of thermal expansion thereof is also the same. A thermal change in a longitudinal direction is the same as that in a lateral direction, and the distance between bearings remains unchanged. In addition, falling of the shaft due to the change in temperature is eliminated. The hub 6 is made of aluminum whereby the outer peripheral surface of the hub 6 and the collar portion can be subjected to race processing (a grinding process), thus enhancing the accuracy.

Moreover, a sleeve formed of a magnetic material is arranged in a portion opposed to the magnetic seal material whereby a magnetic seal construction can be made despite main portions being formed of aluminum. Accordingly, it is possible to prevent foreign matter such as oil and dust from being scattered from the interior of the motor which would otherwise adhere to the surface of the magnetic disk.

While the foregoing description and drawings represent the preferred embodiments of the present invention, it will be obvious to those skilled in the art that various changes and modifications may be made therein without departing from the true spirit and scope of the present invention.

What is claimed is:

1. In a motor for driving an aluminum magnetic disk in which a rotational center of said magnetic disk is a fixed shaft, said motor having a frame, a shaft formed integral with the frame, an armature mounted on the shaft, a bearing provided on the opposite end of said shaft with respect to said frame, a hub to which a magnetic disk mounted around the shaft is securable, the improvement comprising that said frame, said shaft and said hub are formed of aluminum so that changes in temperature will not adversely affect motor performances due to differences in thermal expansion of these motor parts and that a magnetic sealing arrangement is provided including a magnetic sealing material arranged in the vicinity of said bearing on the shaft end opposite of said frame, a magnetic material being provided opposed to said magnetic sealing material in a radial direction of said hub, and a magnetic fluid arranged between said magnetic sealing material and said magnetic material.

2. A disk driving motor according to claim 1, wherein said magnetic material comprises a ferromagnetic sleeve for restricting movement of said bearing along said shaft, said sleeve completing the magnetic path for sealing said motor.

3. A disk driving motor according to claim 2 wherein said sleeve is arranged to prevent foreign matter from the interior of the motor from reaching the surface of said magnetic disk.

* * * * *